(12) United States Patent
Borbolla Gonzalez

(10) Patent No.: US 6,852,057 B2
(45) Date of Patent: Feb. 8, 2005

(54) SELF-CONTAINED CONTINUOUSLY-VARIABLE TRANSMISSION WITH MECHANICAL INTEGRAL TORQUE CONVERTER HAVING AUTOMATIC DRIVE CONTROL

(76) Inventor: Teodoro R. Borbolla Gonzalez, Espuela No. 77, Colonia Rancho Alegre, C.P. (MX), 45640

( * ) Notice: Subject to any disclaimer, the term of this patent is extended or adjusted under 35 U.S.C. 154(b) by 0 days.

(21) Appl. No.: 10/464,985

(22) Filed: Jun. 19, 2003

(65) Prior Publication Data

US 2004/0014548 A1 Jan. 22, 2004

Related U.S. Application Data

(63) Continuation-in-part of application No. 10/168,056, filed as application No. PCT/MX00/00055 on Dec. 15, 2000.

(30) Foreign Application Priority Data

Dec. 17, 1999 (MX) .............................................. 9911945

(51) Int. Cl.$^7$ .............................................. F16H 15/48
(52) U.S. Cl. ...................................................... 475/186
(58) Field of Search ................................ 475/186, 183, 475/214

(56) References Cited

U.S. PATENT DOCUMENTS

| 1,655,079 | A | * | 1/1928 | Weiss | .......................... 475/186 |
| 1,978,439 | A | | 10/1934 | Sharpe | |
| 3,241,382 | A | | 3/1966 | Temple | |
| 3,461,745 | A | * | 8/1969 | Temple | ......................... 475/186 |
| 3,789,699 | A | * | 2/1974 | Guichard | .................... 475/186 |
| 4,229,985 | A | | 10/1980 | Borello | |
| 4,553,450 | A | | 11/1985 | Gizard | |
| 4,644,821 | A | | 2/1987 | Sumiyoshi et al. | |
| 5,395,292 | A | | 3/1995 | Fellows et al. | |
| 5,564,998 | A | | 10/1996 | Fellows | |

FOREIGN PATENT DOCUMENTS

| FR | 1397291 | 8/1965 |
| JP | 3249459 | 11/1991 |

OTHER PUBLICATIONS

International Search Report, PCT/MX 00/00055, dated Jun. 5, 2001.

* cited by examiner

Primary Examiner—Dirk Wright
(74) Attorney, Agent, or Firm—Honigman Miller Schwartz and Cohn LLP

(57) ABSTRACT

A transmission for automotive use, comprising a planetary gear system that receives power in the planetary holder and initially transmits said power in a direct manner with low passage ratio by means of the sun gear and subsequently transmits said power in a regulated manner to preserve optimal engine power by means of a planetary gear system mounted inside a cylindrical impeller coupled to the annular gear which circumferentially incorporates a spiral rack, and that transmits the traction to the satellite gears, at certain diameter of the impeller corresponding to the demanded power, and then to a central variable speed gear depending on the required torque that is measured by a sensor mechanism mounted in the sun gear, which can be regulated to maintain an output torque for overdrive or economy. The sun gear is coupled to a shaft, which initially serves as a transmission, having a spiral slot that places the receiving system in a longitudinal position corresponding to the required power in order contact a given diameter of the cone while synchronizing the change of ratio by substracting the difference in speeds between the shaft coupled to the central gear, and that of the sun gear.

15 Claims, 6 Drawing Sheets

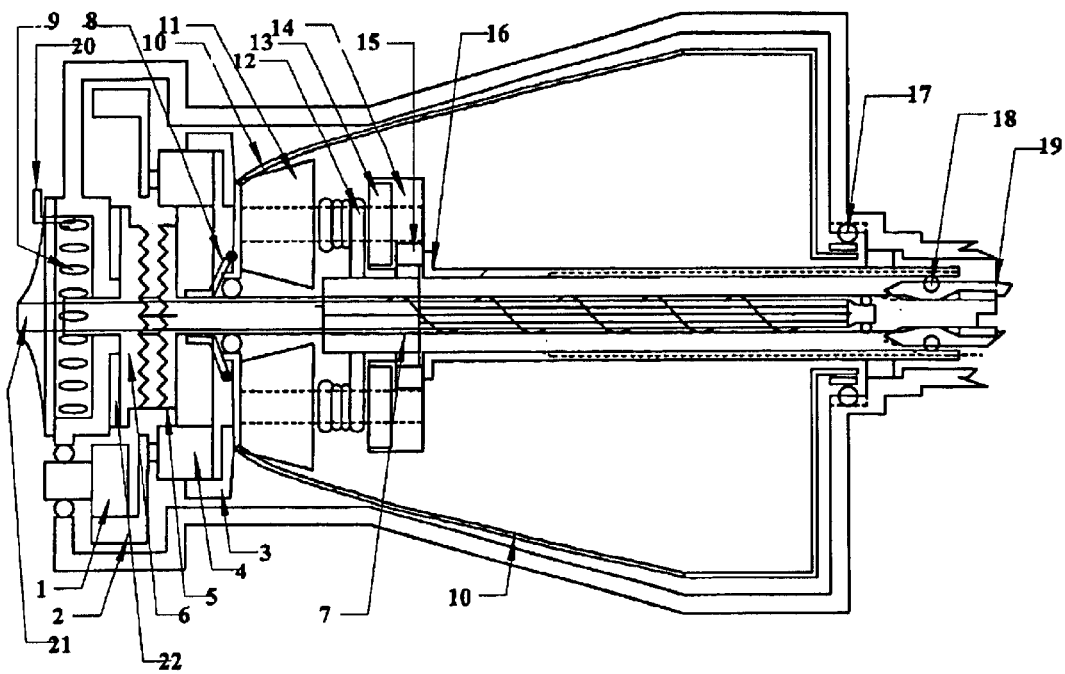
FIG. 1A
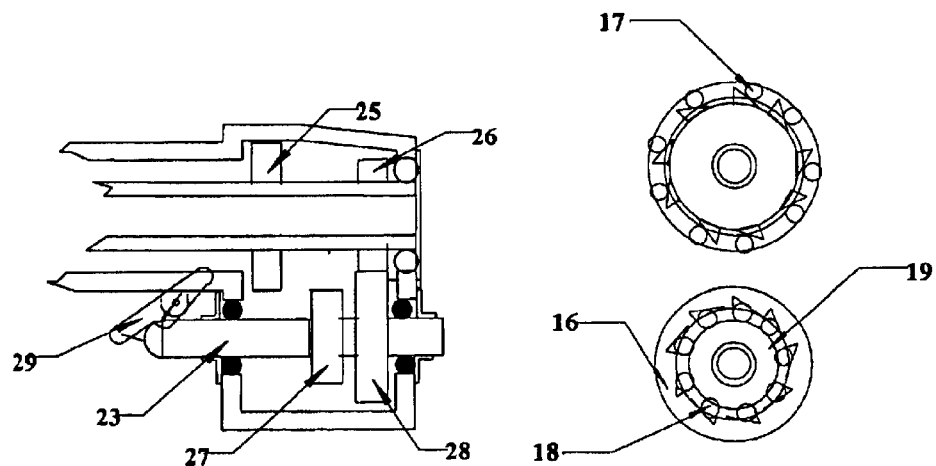
FIG. 1B
FIG. 1C

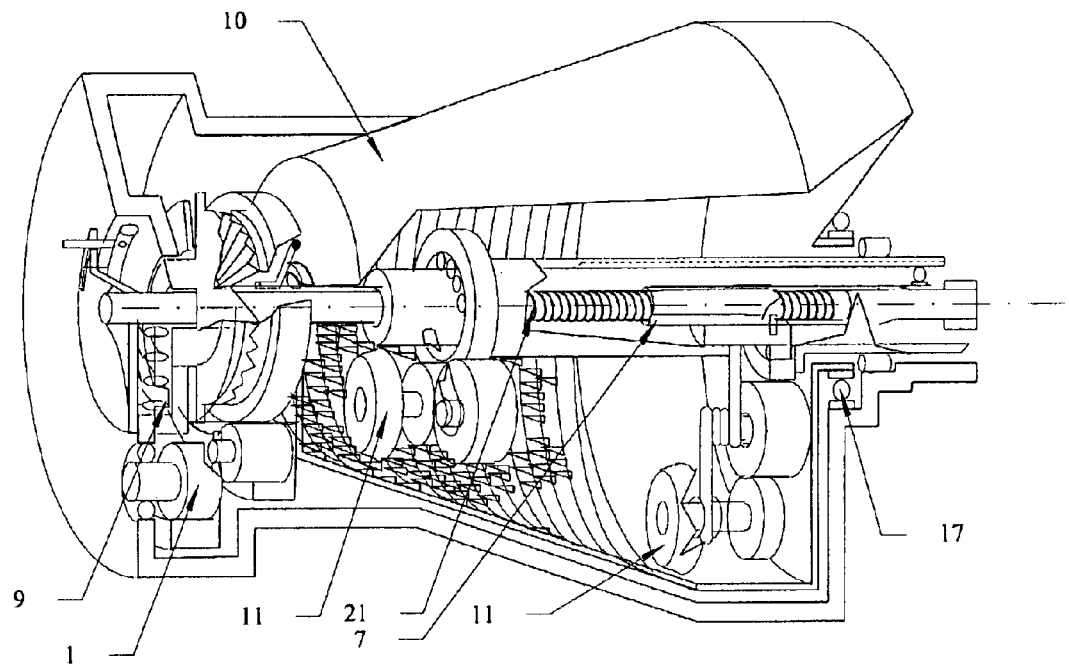
FIG. 3
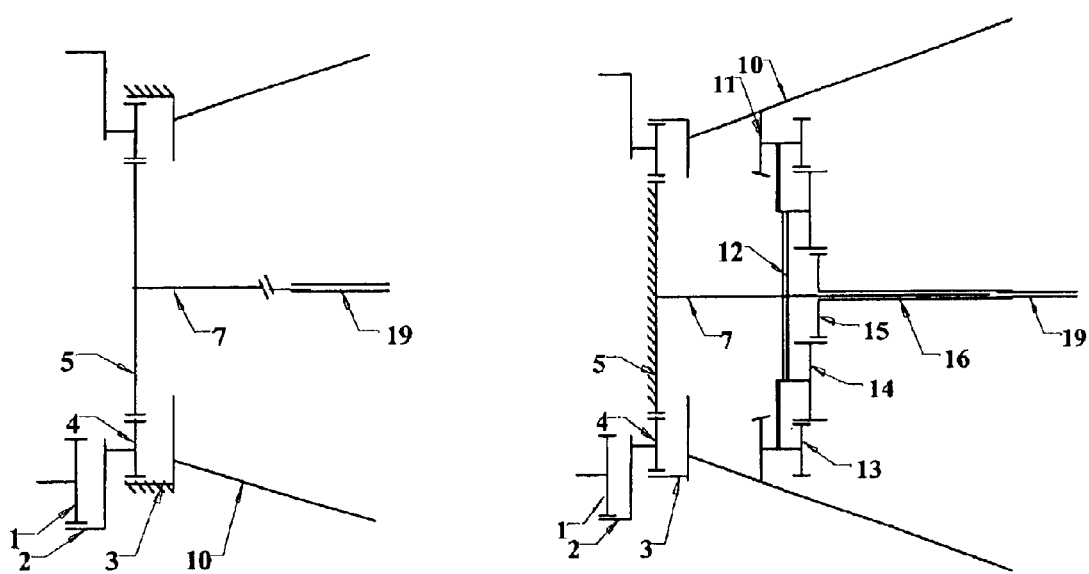
FIG. 4A
FIG. 4B

SELF-CONTAINED CONTINUOUSLY-VARIABLE TRANSMISSION WITH MECHANICAL INTEGRAL TORQUE CONVERTER HAVING AUTOMATIC DRIVE CONTROL

CROSS-NOTING TO RELATED APPLICATIONS

This application is a Continuation-In-Part of application Ser. No. 10/168,056, filed Jun. 17, 2002, which is the National Stage of International Application No. PCT/MX00/00055, filed Dec. 15, 2000, which claims the benefit of Mexican Application No. 9911945, filed Dec. 17, 1999.

This invention is primarily intended for use as an energy transformation device in the automotive industry; i.e. transmission systems. The device may also be used on any appliance that uses a power plant or requires a constant speed drive.

BACKGROUND

The invention offers a new, simpler assembly of an Infinitely Variable Transmission (IVT), of which there are several designs. Some designs base their operation on the change of speed of some component (normally the sun gear) of a planetary gearing system, to provide variable speed on the output shaft that is integrated directly or indirectly to another one of it's components (normally the annular gear), as is the case of U.S. Pat. No. 5,564,998. This change is regulated by a variator mechanism which employs sliding rollers in one or many pairs of thoroidal discs such as disclosed in U.S. Pat. No. 5,395,292 or through the use of belts that operate in poles with varying diameters as described in U.S. Pat. No. 4,553,450. Another design uses a torque converter in which hydraulic fluid is used between the turbine and the pump to vary it's traction as illustrated in U.S. Pat. No. 4,644,821. There also exists the continually variable transmission like the one disclosed in U.S. Pat. No. 4,229,985 that uses a system of conic rollers with an intermediate ring to modulate speed by varying its angle.

In neither cases it is obtained a positive traction, so that would cause skidding or friction of the involved elements, and a great loss of energy that affects in a more or less degree the efficiency and reliability of the transmission drive, causing the parts to be prone to wear out and excessive maintenance requirements.

All of the described inventions suffer from great losses of power that in a higher or lower degree, affect the efficiency of the engine. In addition, many have a higher degree of complexity in its manufacture, making the mechanisms more expensive in their operation and maintenance.

ADVANTAGES ON THE STATE OF THE ART

1. To control the vehicle's motion through the variations of the transmission and not by the engine's revolutions per minute, so that the engine operates at a constant optimum design speed, under every condition.

2. Improve fuel economy by 30% or above, increase time between service intervals, and improved serviceability.

3. Provide immediate throttle response under any condition using a torque converter that continuously transmits power, and may be provided with a positive gear setting that prevents skidding among the composing elements.

4. To have additional back up power for adverse conditions, such as excess load, steep hills or sudden acceleration.

5. Provide a self-controlled infinitely variable transmission, which operates without the use of external control such as a computer.

6. Provide a completely automatic drive mechanism with additional power available when required, reducing the shifting of drive mechanisms by the operator.

7. Provide a regulating auto-controlled Constant Speed Drive (CSD), using the transmission inversely; by providing the traction through the output shaft.

BRIEF DESCRIPTION OF THE FIGURES

The invention is best understood utilizing the following figures, where

FIG. 1A. Is a cross section view of the transmission (illustrating the parabolic-shaped impeller) operating in the primary sequence.

FIG. 1B. Is a cross section view of the rear part of the transmission operating in the primary sequence and normal drive; it also demonstrates the shift mechanism for Cruise and Neutral.

FIG. 1C. Is a plan view of the unidirectional clutch—bearings (17 and 18) in locked position.

FIG. 3. Is a detailed perspective view of the transmission for the gear rack type.

FIG. 4A. Is a schematic view of the moving parts of the Primary Transmission.

FIG. 4B. Is an schematic view of the moving parts of the Variable Transmission with rollers.

FIG. 4C. Is a schematic view of the Variable Transmission with pitching rollers.

SUMMARY OF THE INVENTION

Figure 1:
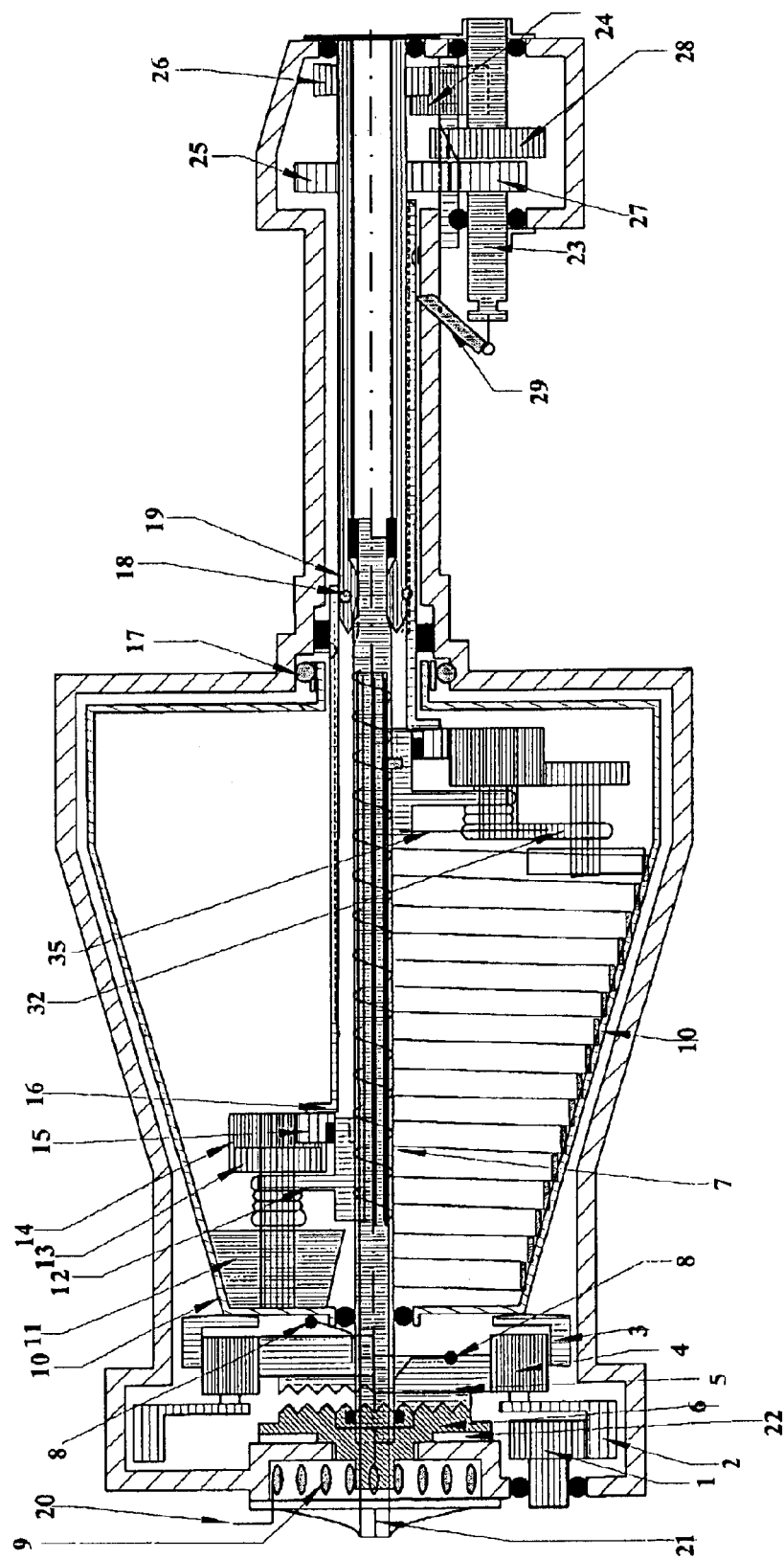
FIG. 1. Is a full illustration of the transmission; allowing view of the primary sequence on the top part of the conic body, and the variable sequence on the lower part (using the gear rack type).

The invention is a Self-Contained Continuously-Variable Transmission with Integral Mechanical Torque Converter having Automatic Drive Control, which consists of three systems that interact harmoniously sharing components and are defined as follows:

A) A Primary Sequence system and a two position traction synchronizer based on a planetary gear system (3, 4 and 5)

which consists of an input gear (1) with an annular gear mounted on a planet carrier (2), an annular gear (3) and an unidirectional clutch (17) mounted on a cylindrical impeller of increasing diameter (10) a set of three or more planets (4) a sliding sun gear (5) a primary traction and control shaft (7) and a double coupling shaft (19).

B) A sliding control system of the traction receptor gear system, and overdrive/economy control that consists of centrifugal counterweights (8) a sliding sun gear (5) a primary traction and control shaft (7), a central splined bar (21), a positioning spider (12), a friction disk (22), a torque sensor consisting of a sensor spring (9) that can be spiral, a lock plate (6), and a shifting mechanism (20).

C) Mechanical torque converter system, of constant speed consisting of a primary traction and control shaft with an hellicoidal slot (7), a central splined bar (21), an annular gear (3), a cylindrical impeller of increasing diameter (10), either with inner plain surface, or incorporating a spiral rack (34) a receiving system (11, 12, 13, 14, 15, 32, and 33) comprises a composed planetary system either with rollers or with satellite gears, where the satellite gears (11) move radially to engage the rack (34) either directly, or by using the rear shafted gears (13), to the planets (14), that transmit traction to the central gear (15) and to the outer shaft (16) under variable speed depending on impeller diameter in which they are located, so that if power is constant, the torque changes at an inverse ratio in respect to said speed.

The primary sequence system consists of an input gear that reduces the engine R.P.M. and transmits it to the planet carrier (2) as demanded by the accelerator.

This system, during the initial acceleration from idle to the optimum engine design speed, keeps the annular gear (3) mounted on the conic impeller (10) fixed to the transmission housing (33) by means of the unidirectional clutch (17), as it restricts the spinning of the impeller in opposed direction due to the reaction force of the working elements of the system. The sun gear (5) then moves backwards unlatching from the lock plate (6), and transmits the torque to the primary traction and control shaft (7), which in turn transfers the torque to the double coupling shaft (19).

Once the optimum engine design speed has been achieved, the centrifuge counter weights (8) extend, and move the sun gear (5) forward, unlatching the primary traction and control shaft(7) from the transmission, and locking it in fixed position to control the variable sequence.

During the primary sequence, the two-position traction synchronizer by means of the second unidirectional clutch (18), frees the outer shaft (16) from the primary traction and control shaft (7) during the initial transmission operation, in order to allow the free rotation of the primary traction and control shaft (7). Once the variable transmission starts operating, the outer shaft (16) will reach the same speed as the double coupling shaft. The second unidirectional clutch will then engage both shafts (16 and 19) so that the outer shaft will now transmit the traction, and the sequence change is synchronized.

The deployment control system of the traction receptor gear system, works as follows: Once the sun gear is placed in it's locked position engage with the lock plate (6) which may have several stops to halt the movement of the sun gear at angular position (α) and perceives the torque's reaction delivered to the transmission, it will surpass the sensor spring (9) supported by the friction plate (22) which dampens the oscillating movement of said sensor spring (9) and acts as a booster, as it reduces the reaction force, by transmitting part of this to the transmission housing (33), so the sensor receives only a proportional part of the force, and will cause the primary traction and control shaft (7) to spin a certain amount of rotations depending on the torque that surpasses the friction and the spring force, and through the hellicoidal groove and the splines of the central bar, will deploy the positioning spider (12) lengthwise. In this manner the receiving system (11, 12, 13, 14, 15, 32, and 33) moves axially through the primary traction and control shaft (7), up to the required position to maintain the said RPM's of the conic impeller (initially all the way forward, because it requires more torque).

The mechanical torque converter consists of a cylindrical impeller of increasing diameter (10), which may have an inner plain surface, or incorporate a rack (34) in its inner surface, said impeller will have a restricted rotation through an unidirectional clutch (17), in order to rotate solely in a "screw-in" rack direction, which is arranged annularly in spiral style, and the teeth of which will be equally spaced to each other, so that the rack (34) can accept the same satellite (11) in any position along its perimeter, and certain number of teeth per spiral turn may be removed to clear satellite gears (specially in small impeller diameters), as continuity of movement of the planets will not be interrupted as the sun gear will keep them gearing position with the spiral rack teeth.

The overdrive and economy control system, spins one end of the sensor spring (9), to increase or reduce manually the torque sensor's tension by means of a mechanism (20), calibrating from inside the vehicle the operation speed of the engine (normally +/−500 RPM), depending on the drive selection. This mechanism will be able to freely rotate in opposite direction within the normal economy range, to dampen the inverse torque during deceleration.

In the mechanical torque converter system, the modulation of the variable pitch rate operates as follows: Once the sun gear (5) has been stopped as described above, the primary transmission and control shaft (7) is engaged to the positioning spider (12) by means of pins sliding through the grooves, which will deploy to a distance corresponding to the received torque. Meanwhile, the annular gear (3) is now moved by the planet gears (4), releasing the conic impeller (10) from the unidirectional clutch (17) as the spin force is now in the opposite direction, transmitting the traction to the receiving system (11, 12, 13, 14, 15, 32, and 33) (in the above described controlled position) engaged by it's back gear (13) to a second planetary system (14) joined to the positioning spider (12) by the pivoting arms (32), transmitting the traction through the central gear (15) that is joined to the outer shaft (16) so the double coupling shaft (19)— now rotated by the outer shaft (16) by the restricted spin of the second unidirectional clutch (18), operates with a variable output speed rate, according to the contact diameter with the conic impeller (10). This position is automatically controlled when the receptor system (11, 13, 14, 15 and 16) is moved lengthwise by the positioning spider (12) pins running through the helical groove of the control shaft (7) along with the central bar's splines (21).

The mechanism has the following characteristics:

1. The engine power is completely transmitted, except for losses due to friction, since a mechanical device of variable pitch is used for torque modulation.

2. It greatly improves the vehicle's driveability, since it has an auto-controlled pitch rate by the engine torque; it has a synchronized shift sequence system, making it easy to operate, optimizing the engine operation, extending it's working life and maintenance laps, increasing fuel economy.

3. It can be used in automotive equipment as a transmission or as an auxiliary back up output speed control in any other type of machine or equipment.

4. The engine works at a constant speed, so accessories such as a generator or electric alternator with fixed frequency for alternating current, or hydraulic pumps with constant flow can be attached.

5. To provide an endless conic spiral gear system that may be used with any kind of mechanism requiring a variable output relation.

6. It is axially assembled and it has relatively few moving parts; making it easier to build, and has fewer failure modes.

7. It has a wide range of mechanical advantage, that is why it only requires an inversing gear for reverse operation, but a gear train with several speeds or just with a single one for cruise speed, can be incorporated depending on the apparatus's requirements.

8. Other accessories such as a torque indicator may be easily added, as well as control systems such as a centrifuge governor, hydraulic, or electric controllers, for the deployment of the variable transmission.

9. If it is used in an inverted way, providing traction to the output shaft, it can work as a Constant Speed Drive at the input shaft.

DETAILED DESCRIPTION OF THE INVENTION

The invention is a Continuously Variable Transmission using a cylindrical impeller with an increasing diameter (10) that may be conic or parabolic and is powered by an engine transmitting a variable torque, while maintaining the same angular input speed.

Within the impeller (10), the torque is transmitted through a roller traction system (11). The rollers are rotated at a variable speed depending on the diameter where they make contact, and are deployed along the inside of the impeller automatically, depending on the power supplied by the engine, and transmitting it to the output shaft (19), at an exact pitch rate, providing the necessary torque to maintain or increase the vehicle's speed instantaneously.

The transmission is made up of two epicyclical gears and rollers systems (FIG. 1A parts 3, 4 and 5 and FIGS. 6A and 6B parts 10 to 15), with concentric shafts (7 and 16), that interact to provide a regulated output transmission. As a result, the operation speed of the engine remains constant and provides the traction with a speed and torque corresponding to the power demanded (FIG. 2A) for the vehicle instant speed.

The invention consists of an initial take-off transmission that operates with a low pitch rate by the sun gear (5) through the primary traction and control shaft (7) while the engine achieves optimum operation speed; and the other through the rear epicyclical gear system which is found in the inner region of the impeller (10), mounted on a spider (12) which moves over the cone's axis along the primary traction and control shaft helicoidal slot (7), concentric to a central splined bar (21), which is located in its interior and typically is mounted to the case (33), in such a way that it can be arranged in a radial or longitudinal position, said primary traction and control shaft (7) rotating via the sensor spring (9), and this way, at any longitudinal position of the satellites (11) a given impeller's (10) diameter and an angular position match up.

Figure 5A:
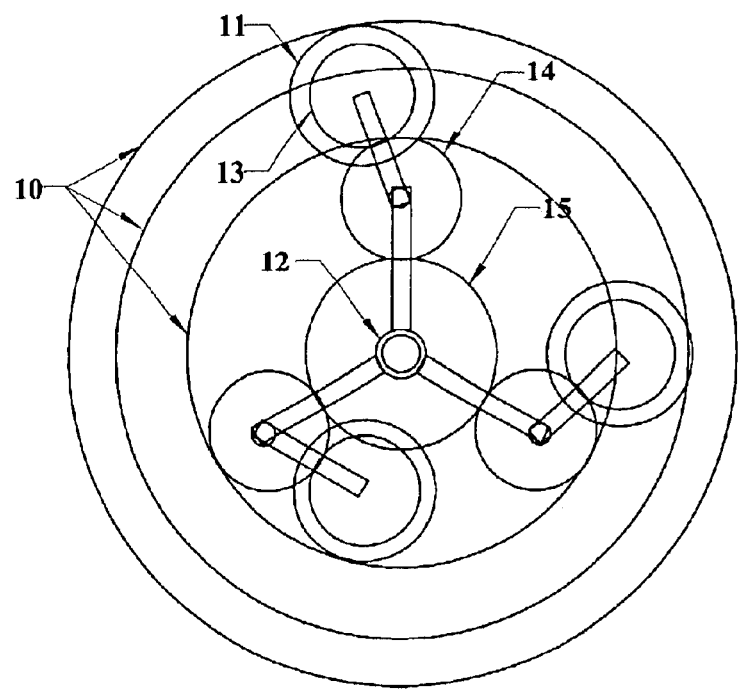
FIG. 5A. Is a simplified figure of the back side view of three displacement positions of the Variable Transmission System showing the roller type.
Figure 5B:
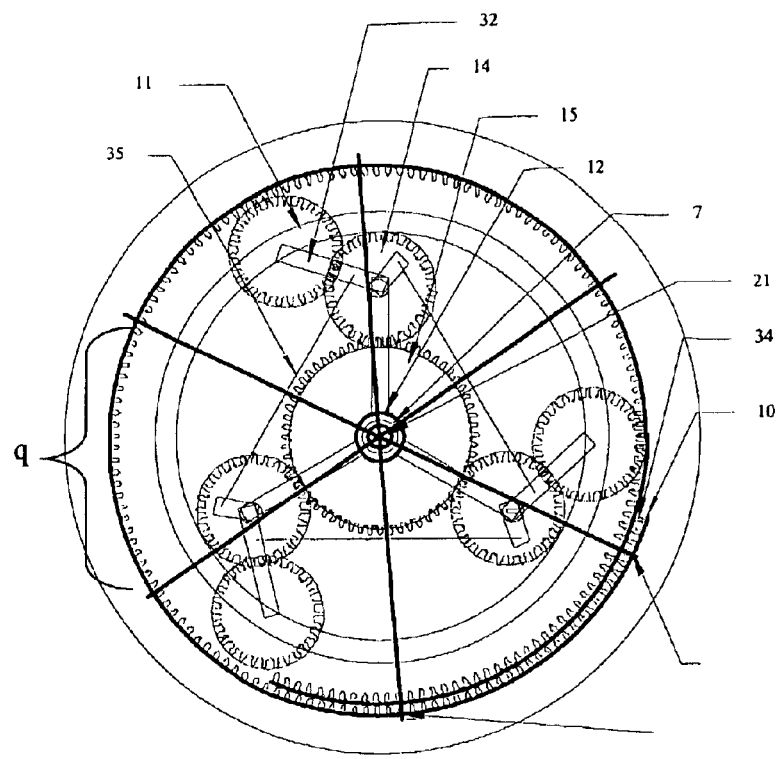
FIG. 5B. Is a simplified figure of the back side view of one position of the Variable Transmission System showing the gear rack type.

The impeller may have a plain inner surface, and transmit the traction to rollers (11 FIG. 5A), or incorporate a spiral rack in its inner surface and transmit the traction to the satellite gears (11 FIG. 5B).

It is to be noted that, when referring to the rack (34) or spiral diameter, it is meant an average diameter of a spiral turn, since the spiral does not have a fixed diameter.

The continuity principle on the gearing sequence between spiral rack (34) and the satellites (11) is based on permanently maintaining the relative position of the satellite's fore part and each spiral turn starting point. This is achieved by providing that each time the rack (34) goes a turn further, the number of tooth increase in a given amount, in such a way that all satellites (11) get into in the rack (34) at the same tooth for each given position ($\alpha$) of the receiving system (11,12,13,14,15,32, and 33), and the last tooth of a spiral turn. spiral turn will always be coincident with the starting point of the same spiral turn.

On the periphery of each spiral turn there will be some teeth coincident with other tooth of the previous spiral turn (equivalent to the number of teeth that were increased), hence each spiral turn will be segmented in a number of arcs (q) between said teeth, on which the receiving system (11, 12, 13, 14, 15, 32, and 33) will transit only during the forward or backward movements to change position. However, the spiral turn cyclic transition will only take place at the angular positions ($\alpha$) where two teeth are aligned.

To vary the position of the receiving system (11, 12, 13, 14, 15, 32, and 33), the whole system is run with the same advance pattern of the spiral, so that the sequence is kept at the intermediate points (q) between said angular positions ($\alpha$), and so that the satellite (11) advance is proportional to the augmenting or decreasing rotation of the spiral turn perimeter. Therefore, when said displacement has the purpose to decrease the diameter, the rotation will be in the same rotation direction of the impeller (10), so that the gear will follow the rack (34) to keep its relative position when shifting to another spiral turn, and so that the off-set teeth is not coincident with the changing position.

Figure 6A:
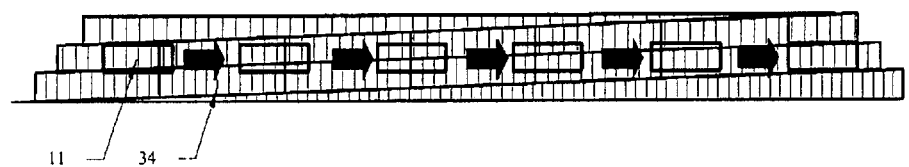
FIG. 6A. Is a sectional view of de cyclical change of sequence for the gear rack type.

By means of the connection rods (35), the satellites (11) from said receiving system (11, 12, 13, 14, 15, 32, and 33) keep the same distance to the impeller's (10) axis, which is the shortest of all, while the rack's (34) radius will broaden at each revolution, because it transfers a rotation which "screws-in". In this way, the contact in a satellite (11) will be lost during the transition of the spiral turn's widest part where it is positioned to the narrowest part, that is, while the satellite changes the spiral turn from the end to the beginning of the spiral turn which corresponds to the longitudinal position of the spider (12) where it is placed (FIG. 6A). In clearing the satellite (11) teeth during the cyclic change of the spiral turn the spiral should have an increase in radius, from one spiral turn to another, so that the teeth are disengaged each time the impeller (10) completes a revolution. The concept of continuous positive variable torque is based in that at least one satellite (11) from the receiving system (11, 12, 13, 14, 15, 32, and 33) is in permanent contact with the impeller's rack (34) (FIG. 5B).

Said cyclic change of the spiral turn by means of the lock plate (6) will be in given points ($\alpha$) of the rack (34), so that the satellites (11) always make the spiral turn change to the position where the first and last teeth of each impeller's (10) cross-sectional plane coincide where they are located, therefore there is no interference present due to the teeth off-setting in the way a Vernier operates. Consequently, the sensor spring (9) will cause said advancing rate to be at specific angular positions, which number of arches (q) is equivalent to the number of teeth increased by each spiral turn, as a result, the greater the teeth increment is, the greater number of angular positions (α) will be, and as a consequence, the greater of transmission relations.

During the transit to increase or decrease the contact radius, the system will maintain its relative position to the impeller (10), to avoid making a spiral turn change where said teeth do not coincide.

Figure 6B:
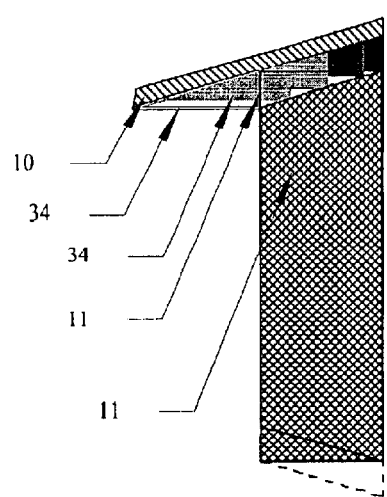
FIG. 6B. Is a side view of the contact point between the satellite gears and the gear rack along the cyclic displacement, for the gear rack type transmission.
Figure 6C:
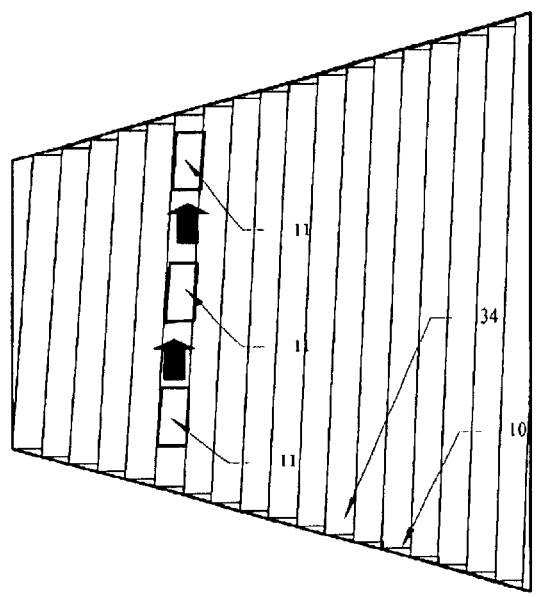
FIG. 6C. Is a transversal view of the gear rack type transmission showing the longitudinal displacement of the receiving system, along the gear rack spiral turn.

In order to synchronize the transition of the satellite (11) entering into the rack (34), the increment in the number of teeth will always be the same from one spiral turn to another, and said satellites (11) will always keep the vector position which corresponds to each longitudinal distance in the impeller's (10) axis for the conditions in which it operates. Therefore, in order to modify the operation, the receiving system (11, 12, 13, 14, 15, 32, and 33) will move over the primary traction and control shaft (7) as indicated before, continuing the advancing rate and rotation of the central splined bar (21), whose chord has a pitch equivalent to the rack (34) advancing rate (FIG. 6C).

The traction control utilizes a torque sensor (9, 20 and 22) linked to the positioning spider's deployment system (5, 6 and 7). The shifting mechanism (20) adjusts the sensor spring (9) sensitivity which, depending on the selection made, will increase the engine operation RPM, to increase the output torque when an excessive load or when a sudden acceleration is required, or reduce the RPM in an inverse way (FIG. 3).

Operation

Figure 2A:
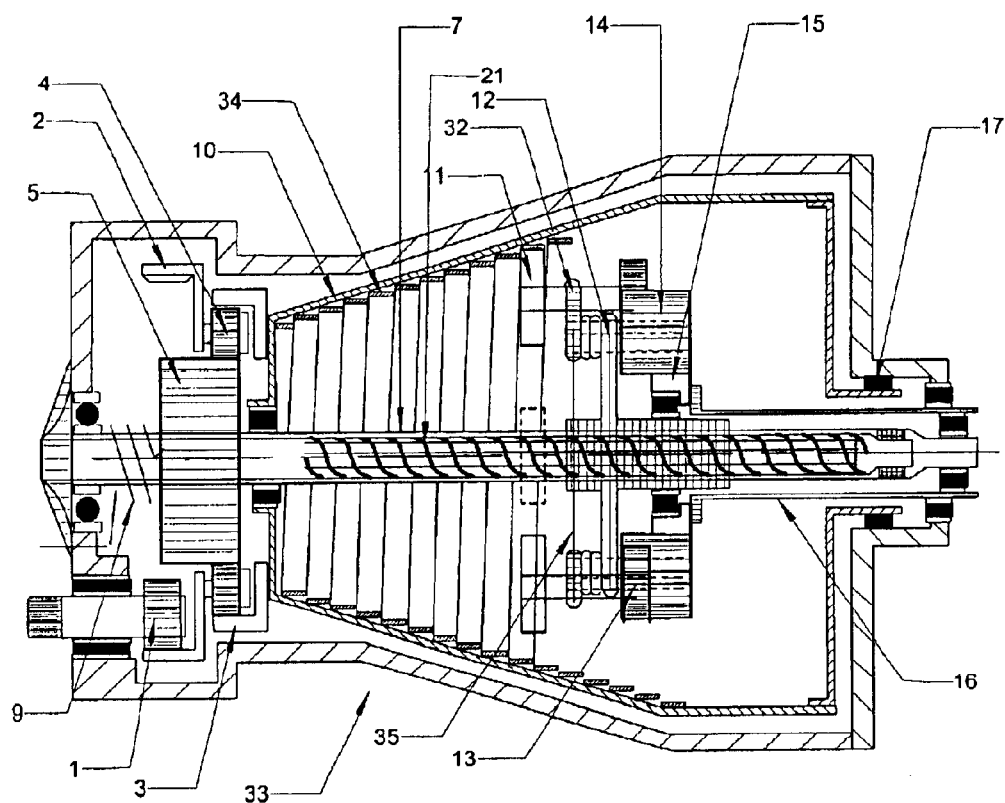
FIG. 2A. Is a sectional view of the transmission (showing the gear rack type) operating the variable sequence.
Figure 2B:
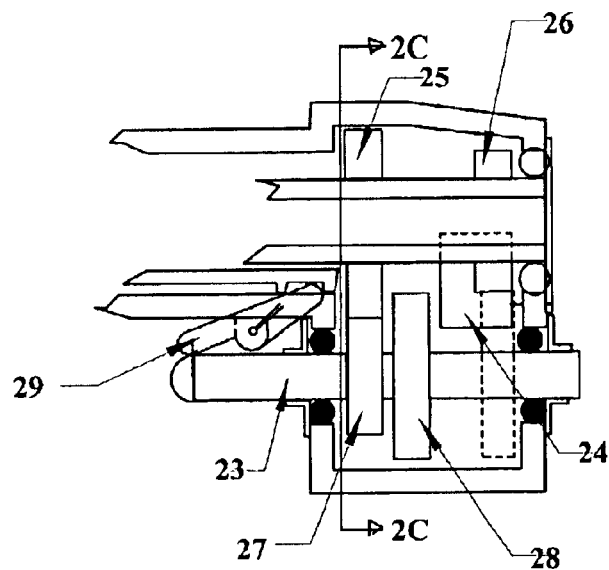
FIG. 2B. Is a sectional view of the rear part of the transmission operating in cruise drive, it incorporates the shift mechanism from Normal to Cruise, Neutral and Reverse.
Figure 2C:
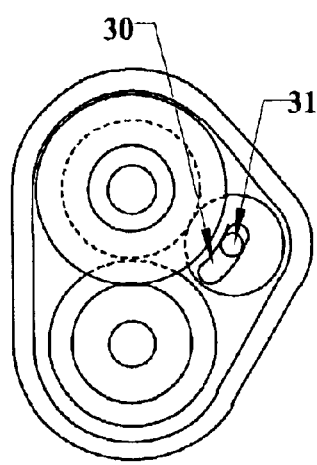
FIG. 2C. Is a sectional view of the rear part of the transmission operating in cruise drive, as indicated in cut line 2C—2C of the FIG. 2B in which the rear gear train is visible.

Turning to the operation of the invention initially, the torque is supplied to the input gear (1), and to the planet carrier (2) where through the planet gears (4), the sun gear (5) and the second annular gear (3) is transmitted indiscriminately; since the sun gear (5) has a higher mechanical advantage because it's pitch rate is less than the variable system's (11 thru 16), (even when it is at its minimum pitch ratio), this gear (5) will then begin to rotate. Consequently, the second annular gear (3) will tend to react in an opposite direction, but the unidirectional clutch (17) prevents it (FIG. 1C).

Since the sun gear is spring loaded, it will remain in its rearward position. Then the primary traction and control shaft (7) firmly linked to the sun gear (5), will engage with the inner grooves of the double coupling shaft (19) thus operating the primary traction.

The speed can be maintained within the take-off range, or if demanded, will be increased until it achieves the optimum engine operating speed. At that moment, the centrifuge counterweights (8) linked to the sun gear (5), will extend causing it to move forward, stopping and locking the sun gear with the lock plate (6) being now linked to the torque sensor mechanism (9, 20, and 22), and disengaging the primary traction and control shaft (7) from the double coupling shaft (19).

Keeping the sun gear locked in the forward position, the controlled sequence begins operating. The transmission will now operate through the second annular gear (3) coupled to the impeller (10) that will rotate in the same direction as the primary transmission and will be freed from the unidirectional clutch (17); transmitting the traction to the second planetary system inside of the impeller (11, 12, 13 and 14), which will deploy axially and is linked by the central gear (15) to the outer shaft (16).

The outer shaft (16) has the second unidirectional clutch integrated (18), since all along the shaft there are grooves shaped in such way that will limit the rotation of the balls (FIG. 1C), operating as the outer race characteristic of this kind of clutch, which during the operation of the primary transmission will not allow it to interfere with the primary traction and control shaft (7), but when it has higher relative speed than this shaft, will hook the balls transmitting now the traction to the double coupling shaft (19) and thus synchronizing the change of sequence.

Once the impeller (10) is turning, it will engage the outer shaft (16) with the rest of the transmission as described above, hooking up the positioning spider with the helical groove of the primary traction and control shaft, which function is now the control of the transmission. The reaction torque of the sun gear will allow the shaft to turn backwards proportionately to this torque, and in combination with the splines of the central splined bar (21) that may have a helical path to compensate for the backwards component resulting from the contact force of the rollers (11) with the cone (10); it will deploy the roller system (11–16) initially backwards, but when raising the impellers traction, it will increase the torque and they will be brought back to their natural position (corresponding to the optimum RPM designed for the engine and that is, going forward).

When the demand for power is increased, the sun gear rotates overcoming the sensor spring (9) tension and the friction force of the friction disk (22), making the primary traction and control shaft spin proportionally to the torque. The roller system (11–16) will move forward to contact a smaller diameter of the impeller until the vehicle raises its speed and consequently the torque will decrease, then the receiving system (11, 12, 13, 14, 15, 32, and 33) will move backward to contact a bigger diameter of the impeller so that without increasing the impeller's speed, the speed of the rollers (11), the second planet gears (14), the central gear (15), the outer shaft (16), the double coupling shaft (19), and consequently the transmission speed will increase, while the engine maintains a constant speed (FIGS. 6A and 6B).

Should it be required to over speed the engine operation during the controlled sequence at any given moment; the external tip of the sensor spring (9) must be rotated through the shifting mechanism (20), as so to increase the spring's tension, so that the mechanism requires more power to defeat the control system (FIG. 3) forcing the sliding system (11–16) to stay up front more than it normally would, operating with less speed and more torque, and the opposite of this if it is desired to operate softly (normally at high vehicle speeds), the inverse operation will be carried out.

In the same way, if the cruise selection is armed, when the transmission reaches certain number of output revolutions per minute—proportionately to the deployment of the output shaft (16), the connecting link (29) will be activated, moving forward the counter shaft gear assembly (23), to obtain a greater pitch rate. Since the output torque will be increased abruptly, the torque sensor (9, 20, 22) will immediately move forward the group of rollers (11–16) to a position in which the engine is stable again in it's best operating condition, and will continue operating with the controlled traction system; when reducing the vehicle's speed under said R.P.M., it will go back to it's original gear relation with the same inverse process.

If the speed is reduced in a way that an excessive torque be required (corresponding to the primary sequence), the roller system (11 through 16) will initially deploy forward completely, but since the torque is bigger than the one corresponding to this position, the sun gear will be unlatched, liberating itself from the halting position, to then transmit the traction in a primary sequence.

When receiving a negative torque (due to a higher vehicle speed than the corresponding engine RPM—as in a downhill race), the sun gear (5) will deploy to it's rear position, spinning the three elements of the planetary system(3, 4 and 5), then the traction will be void until the primary traction and control shaft's speed (7) be higher than the outer shaft's (19); at this moment as corresponds, the sun gear will be engaged to the sensor spring (9) by the lock pate (6), or the impeller (10) will be locked once more, through the unidirectional clutch (17), operating now the variable or the primary sequence again.

If during that event, acceleration is demanded again, the primary traction and control shaft (7) will increase the speed and the counterweights will deploy, in a way that the sun gear (5) will move to the front position, and the variable sequence will continue to operate.

The transmission utilizes an automatic mechanism for cruise or high speed, that arms the connecting link (29), so when the roller system (11 thru 16) achieves a certain deployment, it engages a multiplier gear (27) with a bigger gear at the output shaft (25). When decelerating, the roller system (11 through 16) will go back, and should these return forward to this said position, it will disengage the multiplier gear, now linking gears 26 and 28 again (FIG. 1B).

For the reverse operation, it should be selected manually while the engine runs in idle, by completely moving rearward the counter shaft (23) deploying the reverse shaft (31) through the positioning slot (30) and engaging the reverse gear (24).

The lubricating system of the variable transmission will be routed through a vein inside the central splined bar (21), that distributes the oil through it, thus falling due to gravity on the primary transmission and control shaft (7), and to the rest of the system through the helical groove, and holes scattered throughout the positioning spider arms (12). The other systems will be oiled by immersion or sprinkling.

Other embodiment are with in the claims modifications of this invention will become apparent to those skilled in the art without departing from the scope or spirit of the invention.

What is claimed is:

1. A Self Contained Continuously Variable Transmission (CVT) with an Integral Mechanical Torque Converter having Automatic Drive Control, comprising:
    a stationary housing;
    a primary traction and control shaft (7) having helicoidal slots;
    a cylindrical impeller of increasing diameter (10);
    a double coupling shaft (19);
    a lock plate (6);
    a central splined bar (21) fixed to the housing;
    an input gear (1) that receives motion from an engine;
    an annular gear (2) meshing with said input gear (1);
    a front epicyclical gear system comprising
        a planet gear carrier fixed to said annular gear (2);
        a set of three or more first planet gears (4) mounted on said planet carrier;
        a second annular gear (3) engaging first planet gears (4) and coupled to said cylindrical impeller (10); and,
        a sliding sun gear (5) fixedly coupled to said primary shaft (7) to rotate therewith, and meshing with said first planet gears (4), wherein the sun gear (5) with the primary shaft may slide between two positions, a first position in which the primary shaft is coupled to said double coupling shaft (19) and a second position in which the primary shaft is de-coupled from said double coupling shaft, and in which the sun gear is locked to said lock plate (6) and the primary shaft;
    a control system for controlling the sliding of said sun gear (5) comprising:
        centrifugal counterweights (8) for causing said sun gear (5) and primary shaft (7) to slide between said two positions; and
        a torque sensor comprising:
            a sensor spring (9) hooking said sun gear (5) to said lock plate (6), when it is at said second position; and
            a shifting mechanism (20) for adjusting the sensitivity of said torque sensor (9);
    a first unidirectional clutch (17) mounted on said cylindrical impeller (10) for locking to said housing and releasing said cylindrical impeller;
    a rear epicyclical gear system comprising:
        a system with several satellites (11) moved by said cylindrical impeller (10);
        a set of several rear gears (13) connected by respective shafts to said satellites (11);
        a set of several pivoting arms (32) that carries said rear gears and shafts;
        a second set of several planet gears (14) engaged to said rear gears (13);
        a positioning spider (12) holding said pivoting arms (32) and said second set of planet gears, wherein said positioning spider (12) may be deployed along said primary shaft (7) by interaction of a pin fixed to said spider with said helicoidal slots and said splines of said splined bar (21);
        a central gear (15) mounted on said positioning spider and engaging said second set of planet gears (14); and
        an outer shaft (16) fixed to said central gear (15);
    a second unidirectional clutch (18) arranged between said outer shaft (16) and said double coupling shaft (19) for engaging and disengaging said outer shaft (16) to said double coupling shaft (19), which outputs torque from said infinitely variable transmission.

2. The Continuously-Variable Transmission according to claim 1, further comprising a rear gear train (23, 24, 25, 26, 27, and 28) for multiplying and reverse, operation, and a connecting link (29) for deployment of countershaft (23) which be the output of the transmission drivingly connected to said double coupling shaft (19).

3. The Continuously-Variable Transmission according to claim 2, wherein said primary shaft (7), input gear (1), first planet gears (4), satellites (11), rear gears and shafts (13), second planet gears (14) countershaft (23), and wherein a multiplier gear (27) and linking gear (28) of said rear gear train have their own axis which is parallel with each other.

4. The Continuously-Variable Transmission according to claim 2, wherein said sliding sun gear (5), annular gear (2), primary shaft (7), double coupling shaft (19), lock plate (6), first unidirectional clutch (17), cylindrical impeller (10), second annular gear (3), positioning spider (12), central splined bar (21), outer shaft (16) and said second unidirectional clutch (18), and wherein an autput (25) and a linking gear (26) of said rear gear train have a lengthwise axis that is common to all of them.

5. The Continuously-Variable Transmission according to claim 1, wherein said input gear (1) transmits the motion to said planet carrier, and to said sun gear (5) during the initial acceleration from zero to a predetermined speed, by keeping said second annular gear (3) fixed to said housing by means of said first unidirectional clutch (17).

6. The Continuously-Variable Transmission according to claim 1, wherein said sun gear (5) has means that deploy said sun gear (5) backwards when not receiving reaction torque, unlatching it from said lock plate (6), and so transmits the torque to said primary shaft (7), which engages said double coupling shaft (19) and disengages said spider (12) from moving.

7. The Continuously-Variable Transmission according to claim 1, wherein said torque sensor (9, 20 and 22) is comprised of a spring which tension is capable of being manually adjusted during the operation of the transmission by said mechanism (20) to surpass the measured force and thus, increase or reduce a speed of a power plant engaged to said input gear (1).

8. The Continuously-Variable Transmission according to claim 1, wherein the primary traction and control shaft (7) is engaged to said positioning spider (12) by pins running through a helical groove and a slotted central bar, and depending on the torque that surpasses said sensing system, will deploy said positioning spider (12) lengthwise.

9. The Continuously-Variable Transmission according to claim 1, wherein said impeller of increasing diameter (10) is either conic or parabolic shaped, and is freed from said housing when said sun gear (5) deploys to unlatch said primary traction and control shaft (7) when receiving reaction torque, latching said sun gear to said lock plate (6) and to said torque sensor (9, 20, and 22), and so transmits the torque to said cylindrical impeller and satellite system.

10. The Continuously-Variable Transmission according to claim 1, wherein said cylindrical impeller and satellite system (11) comprises a geared system including:

a spiral turn rack (34) circumferentially integrated to said cylindrical impeller (10), and satellite gears meshing with said rack, and linked to said rear gears and shafts Connection bars (35), slaving the pivoting arms (32) with each other.

11. The Continuously-Variable Transmission according to claim 10, wherein, said pivoting arms (32) pivot at the end of the arms of said spider and are enslaved to each other by means of said connection rods, in order to maintain the same radius, and are spring loaded to extend so that said satellites engage to the nearest turn of the spiral rack having a three-dimensional vector position, for each position of the spider's advancing rate.

12. The Continuously-Variable Transmission according to claim 10, wherein the satellites are engaged to said gear rack, and cyclically change from the end of a spiral turn to the beginning of it, at specific angular positions where the first and last teeth of a turn the spiral rack coincide, and several gear rack teeth may be detached without loosing a gearing of the satellite gear teeth, for being synchronized with the same central gear, transmitting the torque to the second epicyclical gear system.

13. The Continuously-Variable Transmission according to claim 1, wherein said rear gears and shafts (13), engage said second set of planet gears (14) and said central gear (15) fixed to said outer shaft (16), and to said double coupling shaft (19) by said second unidirectional clutch (18) to provide a controller operation.

14. The Continuously-Variable Transmission according to claim 1, wherein said second unidirectional clutch (18) restricts said outer shaft (16) from spinning during the initial transmission operation in order to allow the free rotation of said double coupling shaft (19), but once said outer shaft (16) reaches the same speed as said double coupling shaft (19), said second unidirectional clutch (18) will then match speeds of both shafts so that said outer shaft (16) will now transmit the traction, and the sequence change is synchronized.

15. The Continuously-Variable Transmission according to claim 2, wherein said double coupling shaft (19) engaging with said rear gear train is capable of sequentially shifting upwards or downwards by means of a connecting link (29) every time said outer shaft (16) reaches a predetermined longitudinal deployment.

* * * * *

UNITED STATES PATENT AND TRADEMARK OFFICE
CERTIFICATE OF CORRECTION

PATENT NO. : 6,852,057 B2
DATED : February 8, 2005
INVENTOR(S) : Teodoro R. Borbolla Gonzalez It is certified that error appears in the above-identified patent and that said Letters Patent is hereby corrected as shown below:

Column 10,
Line 43, please delete "," after "reverse".
Line 44, please insert -- a -- before "countershaft".
Line 45, please delete "be" and insert -- is --.
Line 51, please insert -- a -- before "linking".
Line 59, please delete "autput" and insert -- output --.

Column 11,
Line 32, please delete "turn".

Column 12,
Line 9, please delete "spiral turn" and insert -- spire --.
Line 11, please insert -- of -- after "turn".
Line 13, please insert -- position -- after "gearing".

Signed and Sealed this

Seventeenth Day of May, 2005

JON W. DUDAS
*Director of the United States Patent and Trademark Office*